United States Patent
Brady et al.

(10) Patent No.: US 10,301,934 B2
(45) Date of Patent: May 28, 2019

(54) DOWNHOLE X-RAY DENSITOMETER

(71) Applicant: SCHLUMBERGER TECHNOLOGY CORPORATION, Sugar Land, TX (US)

(72) Inventors: Dominic Joseph Brady, Dhahran (SA); Reza Taherian, Al-Khobar (SA); Gary Oddie, St. Neots (GB); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 89 days.

(21) Appl. No.: 14/663,158

(22) Filed: Mar. 19, 2015

(65) Prior Publication Data
US 2016/0274038 A1    Sep. 22, 2016

(51) Int. Cl.
*E21B 49/00*    (2006.01)
*G01V 5/12*     (2006.01)
*E21B 47/10*    (2012.01)

(52) U.S. Cl.
CPC .............. *E21B 49/00* (2013.01); *E21B 47/10* (2013.01); *G01V 5/12* (2013.01)

(58) Field of Classification Search
CPC ......... G01N 23/00; E21B 49/00; E21B 47/10; G01V 5/12
USPC ..................................................... 250/269.1
See application file for complete search history.

(56) References Cited

U.S. PATENT DOCUMENTS

| | | |
|---|---|---|
| 7,507,952 B2 | 3/2009 | Groves et al. |
| 7,542,543 B2 | 6/2009 | Shampine et al. |
| 7,564,948 B2 | 7/2009 | Wraight et al. |
| 7,639,781 B2 | 12/2009 | Shampine et al. |
| 7,684,540 B2 | 3/2010 | Groves et al. |
| 7,903,782 B2 | 3/2011 | Groves et al. |
| 8,975,593 B1 | 3/2015 | Best et al. |
| 2004/0248314 A1* | 12/2004 | Stephenson .......... G01N 33/241 436/139 |

(Continued)

OTHER PUBLICATIONS

Imashuku, S. et al, "Development of a Palm-Size Electron Probe X-Ray Analyzer", JCPDS—International Centre for Diffraction Data (2012) ISSN 1097-0002, pp. 252-256.

(Continued)

*Primary Examiner* — David P Porta
*Assistant Examiner* — Gisselle M Gutierrez (57) ABSTRACT

A downhole densitometer is used to determine one or more characteristics of a flowing fluid. The densitometer has one or more downhole x-ray sources and one or more downhole x-ray detectors. A fluid is allowed to flow past the x-ray sources. X-rays emitted by the x-ray sources and that have travelled through the flowing fluid are detected by the x-ray detectors. Characteristics of the flowing fluid are determined based on the detected x-rays. The densitometer may also have reference detectors used to measure a reference signal. The measured reference signal is used to normalize source emissions. The densitometer may be used as a permanent monitor and it may be used in conjunction with other sensors such as a flow-rate sensor or a capacitance sensor. The x-ray source may be, for example, a pyroelectric source, a radio-isotopic source, or a traditional x-ray tube source.

23 Claims, 5 Drawing Sheets

(56) References Cited

U.S. PATENT DOCUMENTS

| | | | | |
|---|---|---|---|---|
| 2005/0269499 | A1* | 12/2005 | Jones | B08B 7/028 |
| | | | | 250/269.1 |
| 2007/0287190 | A1 | 12/2007 | Chevalier et al. | |
| 2008/0302533 | A1 | 12/2008 | Richard et al. | |
| 2010/0147349 | A1* | 6/2010 | DiFoggio | E21B 36/04 |
| | | | | 136/201 |
| 2012/0087467 | A1* | 4/2012 | Tjugum | G01N 23/223 |
| | | | | 378/54 |
| 2012/0138782 | A1* | 6/2012 | Simon | G01V 5/125 |
| | | | | 250/254 |
| 2013/0329859 | A1 | 12/2013 | Groves et al. | |
| 2014/0060821 | A1 | 3/2014 | Rodney et al. | |
| 2014/0117246 | A1 | 5/2014 | Zhou et al. | |
| 2014/0208768 | A1 | 7/2014 | Bacic | |
| 2015/0115992 | A1 | 4/2015 | Fushie et al. | |
| 2015/0211350 | A1* | 7/2015 | Norman | G05B 15/02 |
| | | | | 700/275 |
| 2016/0320520 | A1 | 11/2016 | Hiles et al. | |
| 2017/0169909 | A1 | 6/2017 | Tkabladze et al. | |
| 2018/0188409 | A1 | 7/2018 | Manclossi et al. | |
| 2018/0188412 | A1 | 7/2018 | Beekman et al. | |

OTHER PUBLICATIONS

Geuther, J.A. et al., "High-Energy X-ray Production With Pyroelectric Crystals," Journal of Applied Physics 97, (2005), 5 pp.

Geuther J., et al, "Electron Acceleration for X-Ray Production Using Paired Pyroelectric Crystals," Rensselaer Polytechnic Institute, pp. 591-595.

Fukao, S., et al, "X-rays Source Using Thermal Excitation of Pyroelectric Crystal for Medical Application", Progress in Electromagnetics Research Symposium Proceedings, Moscow, Russia, Aug. 18-21, 2009, pp. 807-815.

Gall, B., et al, "Investigation of the Piezoelectric Effect as a Means to Generate X-Rays," IEEE Transactions on Plasma Science, vol. 41, No. 1, Jan. 2013, pp. 106-111.

Gall, B.B. et al, "High Voltage Piezoelectric System for Generating Neutrons", Digest of Technical Papers—IEEE International Pulsed Power Conference [1-4673-5167-9] (2013).

Sarrazin, P., et al, "Carbon-Nanotube Field Emission X-Ray Tube for Space Exploration XRD/XRF Instrument", International Centre for Diffraction Data (2004 Advances in X-ray Analysis, vol. 47, pp. 232-239.

International Search Report for corresponding International Application Serial No. PCT/US2016/020399 dated Jun. 10, 2016, 3 pp.

Fitzgerald, et al, "Continuous Gamma-ray Densitometry in a Borehole Flow Meter," IEEE Nuclear Science Symposium Conference, vol. 2 (2003) Article No. N26-64, pp. 732-736.

Webster, et al., "Multiphase Well Surveillance with a Permanent Downhole Flowmeter," SPE90024, (2204) Society of Petroleum Engineers, 8 pp.

Amptek X-ray Generator with Pyroelectric Crystal, http://www.amptek.com/pdf/coolx.pdf, accessed Sep. 13, 2016, 4 pp.

Bertuccio, et al., "Silicon Carbide Detectors for in vivo Dosimetry," IEEE Transactions on Nuclear Science, vol. 6, No. 2, Apr. 2014.

Bertuccio, et al., "Study of Silicon Carbide for X-Ray Detection and Spectroscopy," IEEE Transactions on Nuclear Science, vol. .50, No. 1, Feb. 2003.

Lansley, et al., "CVD Diamond X-ray Detectors for Radiotherapy Dosimetry," IEEE Sensors 2009 Conference.

Terry, et al., "Evaluation of COTS Silicon Carbide Photodiodes for a Radiation-hard, Low-Energy X-Ray Spectrometer," 2011 IEEE Nuclear Science Symposium Conference Record.

Trucchi, et al., "Very Fast and Primingless Single-Crystal-Diamond X-Ray Dosimeter," IEEE Electron Device Letters, vol. 33, No. 4, Apr. 2012.

Office Action for the related U.S. Appl. No. 15/393,805 dated Aug. 10, 2018.

Office Action for the related U.S. Appl. No. 15/393,793 dated Oct. 4, 2018.

* cited by examiner

DOWNHOLE X-RAY DENSITOMETER

BACKGROUND

An intelligent completion system can both characterize and control the reservoir fluids flowing within a given compartment of the system. For example, the system may use a venturi and its associated differential pressure of the fluid to monitor the flow rate, and a capacitance sensor to measure the water cut (volumetric ratio of water produced to total liquids produced). Existing systems are generally limited, however. For example, such systems may be limited to water cut measurements in a range up to phase inversion, or may fail to include the detection of gas ingress. Nuclear-based flow metering is an alternative measurement means, but such tools are sometimes not available. For instance, some applications or users preclude/forbid the use of a nuclear source. Pyroelectric x-ray generators are known, but current implementations tend to yield inadequate signal-to-noise ratios due to, for example, limited photon flux, limited photon energies, and poor source stability and control. Cost-effective true three-phase downhole flowmeters are an aspiration, which is yet to be fully realized by the industry

SUMMARY

A downhole densitometer is used to determine one or more characteristics of a flowing fluid. The densitometer has one or more downhole x-ray sources and one or more downhole x-ray detectors. A fluid is allowed to flow past the x-ray sources. X-rays emitted by the x-ray sources and that have travelled through the flowing fluid are detected by the x-ray detectors. Characteristics of the flowing fluid are determined based on the detected x-rays.

In a further embodiment, a system is disclosed with one or more downhole x-ray sources disposed in a source housing. The source housing is disposed in a tool housing having a central passageway and a fluid flows through the tool housing. The tool housing has one or more downhole x-ray detectors mounted in the tool housing.

In an embodiment, a system, is used to determine one or more characteristics of a flowing fluid. The system has one or more downhole x-ray sources disposed in a source housing. The source housing is disposed in a tool housing having a central passageway and a fluid flows through the tool housing. The tool housing has one or more downhole x-ray detectors mounted in the tool housing. A processor is located on the earth surface or carried on the tool housing and is capable of flowing a fluid through the central passageway and past the one or more x-ray sources and detecting by the one or more x-ray detectors, x-rays emitted by the one or more x-ray sources that have travelled through the flowing fluid and determining one or more characteristics of the flowing fluid based on the detected x-rays.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to use x-rays for downhole densitometry to measure the gas, oil, and water ratios of downhole hydrocarbon production is disclosed. The downhole densitometer may be used in conjunction with and as a supplement to other sensors such as flow-rate sensors, capacitance sensors, and/or pressure sensors. The use of solid state x-ray sources or other compact sources of low energy x-rays and of detectors that operate at low voltages and with low power electronics allows for high reliability in a permanent monitoring mission profile (e.g., permanent monitoring a completed well). The small sizes of compact generators and compact detectors lend themselves to use in the often space-constrained downhole environment. The disclosed system and method make use of a source of x-rays or gamma rays in a pressure resistant housing to provide sufficient photon flux to one or more detectors while allowing the interrogation (i.e., the making of measurements on) of a sufficient volume of flowing fluid to produce reliable data and to characterize the spatial variations of the fluid. The source emissions may be normalized to an inferred or measured output of the x-ray or gamma ray source.

The use of the densitometer as a permanent monitoring tool mitigates the need for high speed measurements since one may integrate or average the measurements over many minutes of data. The averaging time may be controlled to match the flow regime being measured so that one can account for variable composition, as might be experienced, for example, in slug flows. Similarly, when used to supplement other measurement devices (e.g., flow-rate and capacitance sensors), lower fidelity density measurements may be adequate, while avoiding the safety and regulatory complexity of employing nuclear source densitometers. The relatively low cost of possible solid state x-ray sources allows one to include a plurality of such sources, if desired, with different targets to control intensity and energy. For sources other than x-ray sources, such as gamma ray sources, one may use different sources and different shielding materials to adjust intensity and provide an appropriate energy spectrum of the emitted radiation.

Figure 1:
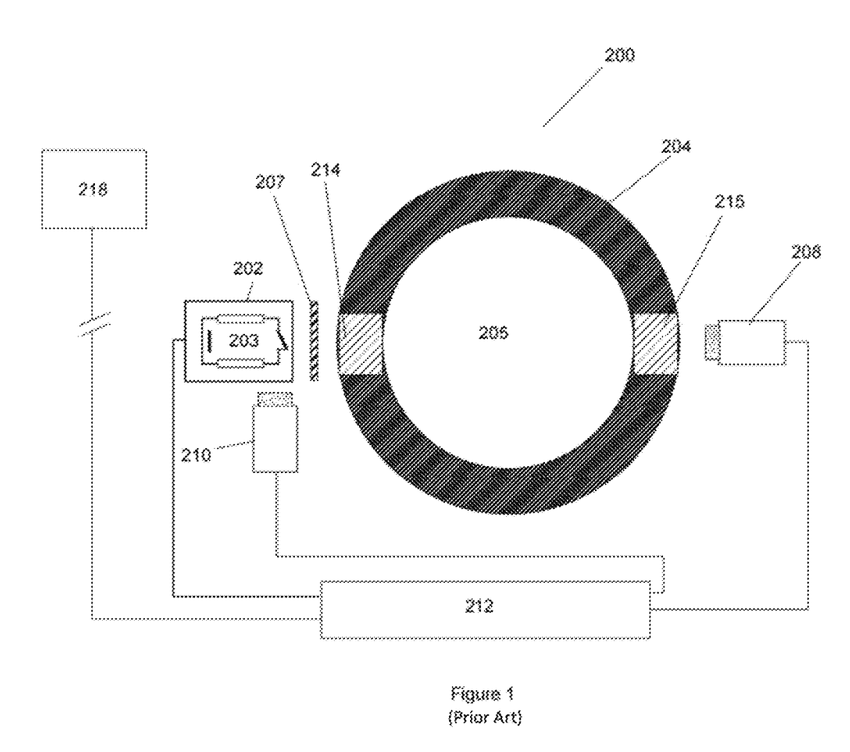
FIG. 1 is a schematic, partial cross-sectional drawing of a prior art fluid density measurement apparatus that uses x-rays.

FIG. 1 shows a prior art apparatus 200 that uses an x-ray source (or generator) 202 for measuring borehole fluid properties and composition (see also U.S. Pat. No. 7,542, 543). The x-ray tube 203 in the x-ray generator 202 produces x-rays that pass through an optional x-ray filter 207 and through entrance window 214 in the wall of pipe 204 and enter the fluid 205 in the pipe. Some of the x-rays may be scattered or absorbed in the fluid. A reduced number of x-rays will pass through exit window 215 and be detected by x-ray detector 208. The x-ray output, i.e., the intensity and energy, may be monitored by the optional reference detector 210. The detector(s) and the x-ray generator(s) are controlled by control unit 212 and the control unit may communicate the measurement to a remote station 218. The x-ray flux information, such as total flux and possibly energy distribution is used to determine fluid properties such as density and photoelectric factor, which are used to infer the fluid composition in terms of water, oil and gas.

Figure 2:
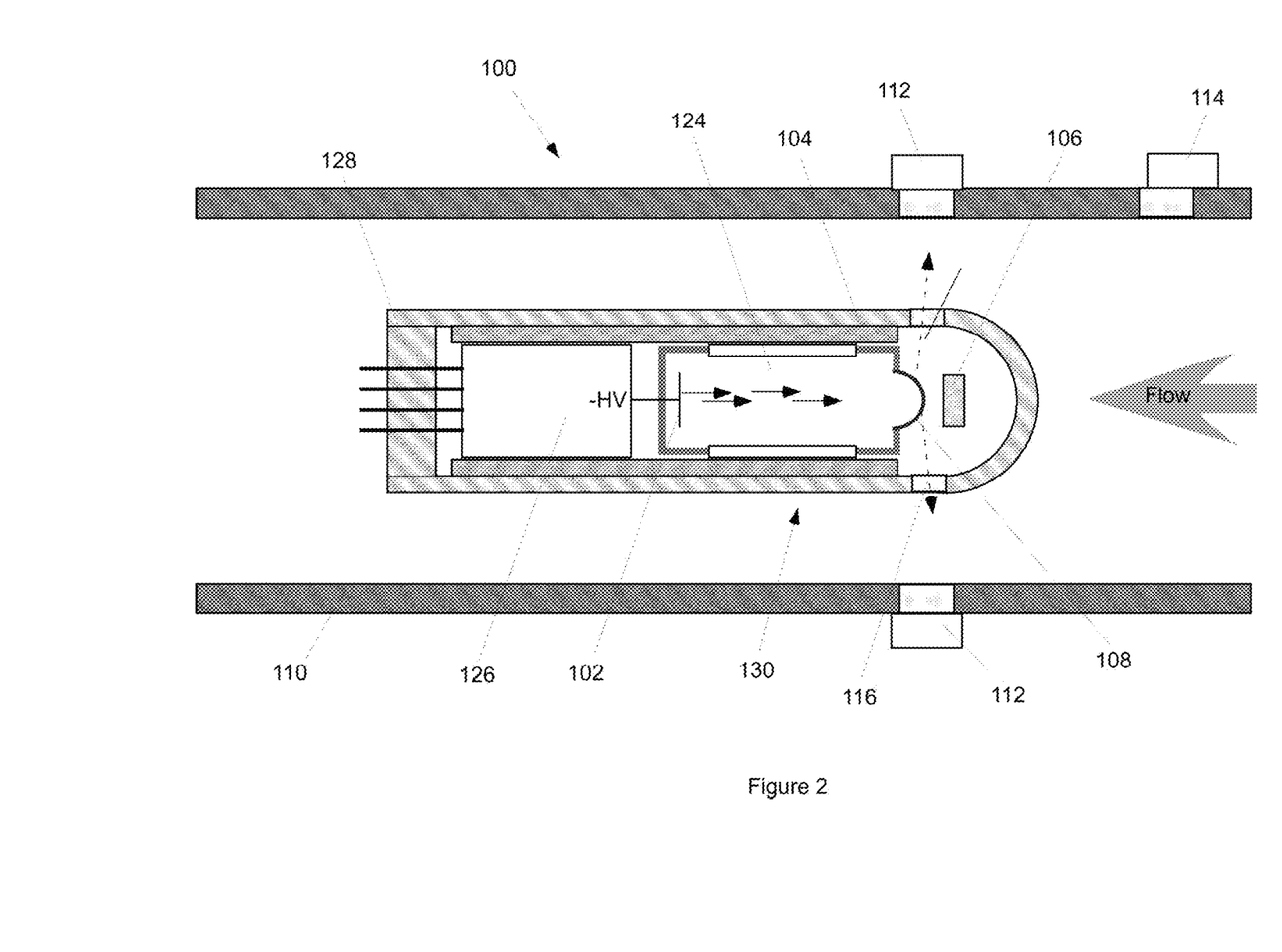
FIG. 2 is a schematic, cross sectional drawing of a downhole densitometer that uses x-rays to measure the gas, oil, and water ratios of downhole hydrocarbon production, in accordance with the present disclosure.

The prior art uses bulky x-ray generators and typically large detectors such as scintillation detectors coupled to photomultipliers. The measurement is performed by having the x-rays traverse a large diameter pipe, typically downstream from a mixing device such as a venturi to obtain a uniform fluid. For permanent monitoring applications, but also for future applications at the surface, there is a need for a compact, rugged, low power system to perform the measurement of the fluid density or more generally fluid composition. This can be achieved by the use of smaller components and, in some embodiments, by placing the source of x-rays in a pressure container that is mounted inside the pipe with the fluid flowing around the pipe. (See FIG. 2.) The device may be centered or eccentered in the pipe. While FIG. 2 shows a cylindrical geometry for the x-ray source, other geometries may be more suitable for particular applications.

One potential compact source of x-rays is a pyroelectric x-ray generator. Problems commonly encountered with currently existing pyroelectric x-ray generators such as low x-ray energy and/or low flux can, to some extent, be mitigated with material selection and sensor design. Higher energy is possible with certain crystal configurations. Endpoint energies up to 215 keV have been obtained, with peak photon flux at 70 keV. The instability of source emissions can be accounted for by measuring the intensity and/or average energy of each pulse using a reference detector.

A measurement at low energy, although advantageous due to the high sensitivity to the fluid density, necessitates careful attention to materials present other than the fluid for which the properties are to be measured. Such properties include the fluid density but also fluid composition, in particular the presence of sodium chloride. This can be achieved by making measurements using at least two different x-ray energies or in at least two different x-ray energy bands as described in U.S. Pat. No. 7,542,543. X-rays from the source need to be able to enter and exit the fluid with minimal attenuation on the path from the source to the fluid and when exiting the fluid to get to a detector.

Minimization of the attenuation requires that materials in the path of the x-rays have minimal thickness, minimal density, and low atomic number. Table 1 shows the attenuation of 20 keV energy x-rays through a variety of materials. A few of the materials are suitable to serve as materials of construction. This is particularly important since some of these materials serve as a pressure barrier between the measurement instruments and the fluid.

TABLE 1

| Material | Attenuation (20 keV, 1 mm) | Attenuation (20 keV, 3 mm) | Attenuation (20 keV, 5 mm) |
|---|---|---|---|
| Beryllium | 1.9 dB | 2.9 dB | 4.9 dB |
| Carbon | 2.0 dB | 5.7 dB | 9.5 dB |

TABLE 1-continued

| Material | Attenuation (20 keV, 1 mm) | Attenuation (20 keV, 3 mm) | Attenuation (20 keV, 5 mm) |
|---|---|---|---|
| Water | 3.5 dB | 10 dB | 17 dB |
| Aluminum | 15 dB | 44 dB | 74 dB |

At present, pyroelectric x-ray generators provide relatively low x-ray energy and a low x-ray flux in pulses that are several minutes apart. It is clear that with such low energy and flux the structural components in the beam path should not be composed of even very light metallic elements other than beryllium and, similarly, that the length of the beam path through the fluid should be restricted.

FIG. 2 shows one embodiment of a downhole fluid density measurement device using an x-ray source placed in the flow path. The x-ray source is located in a source housing 104, which is disposed in the fluid flow and may be positioned in the center of it. Centering may be used to reduce the length of the x-ray path through the fluid. It allows also for placing multiple detectors at different azimuths to obtain an azimuthal distribution of fluid properties. The source housing 104 contains an x-ray generator 130 with an x-ray tube 124 and associated high voltage supply 126 capable of producing the required high voltage, which may be as low as 20 kV or as high as 100 kV or more. Power for the x-ray generator 130 is provided from the outside through feedthroughs that pass through the bulkhead 128 of the source housing 104. Circuitry and a processor (not shown) for powering and controlling the x-ray generator 130 may be located inside the source housing 104 or may be located remotely outside of the source housing 104.

The source housing 104 may contain one or more reference x-ray detectors 106 to monitor the output (energy and flux) of the x-ray generator tube 130. The source housing 104 may be made of a high strength metal alloy provided with x-ray windows 116, or it may be made of a low z-material such as beryllium or other x-ray transparent material (e.g., carbon fiber, titanium alloys, aluminum, or aluminum-steel, to name a few). A material such as beryllium needs to be protected from corrosion and all material will need protection against erosion due to the moving fluid to prevent a loss of measurement accuracy and an eventual breach of the pressure envelope. X-ray transparent windows 116 may be made of materials such as beryllium or diamond.

The x-ray generator tube 124 is attached to the high voltage supply 126, which provides a negative high voltage to a cathode 102 of the x-ray generator tube 124. The cathode 102, which may be a cold cathode such as a cathode using carbon nanotubes or other field emitting materials (field emitting array or FEA), emits electrons that are accelerated by the high voltage to an anode 108, which is at ground potential. The electron emitter is disposed in a vacuum tube or a low pressure gas tube, which may be incorporated into source housing 104 or source housing 104 may itself form the vacuum envelope. It is to be noted that low pressure or vacuum tubes may be needed to assist or enhance x-ray production, but if a radioisotopic gamma ray source were used, there would be no need for a vacuum tube.

FIG. 2 shows a dome-shaped anode 108 used to provide an azimuthally isotropic emission. However, the geometry can be adapted to a specific application (e.g., a cone-shaped, convex anode could be used instead of the concave dome-shaped anode 108, or the anode could be flat and either perpendicular to or slanted with respect to the electron beam). Accelerated electrons impinge on the material of the anode 108 and Bremsstrahlung x-rays as well as characteristic x-rays of the anode material will be generated. Typically, the anode 108 will be made of a low z-material, which is coated by one or more materials with higher Z to obtain the desired spectrum of x-rays for a given acceleration voltage. While the description above indicates the use of a negative high voltage with respect to ground, other approaches using positive high voltage or negative and positive high voltage (bipolar) may be used depending on the detailed structure of the apparatus.

One or more signal detectors 112 measuring the radiation after it has passed through the borehole fluid are located outside of a pipe or tool housing 110 in a pressure housing (not shown) transporting the fluid. These signal detectors 112 may be any x-ray or gamma ray detectors suited for the detection of low energy x-rays or gamma rays. Such detectors could be, for example, diamond detectors, silicon detectors, silicon carbide detectors, or scintillators coupled to photomultipliers (PMTs) or other photon detection devices. The tool housing 110 is typically made of a steel alloy, which is not transparent to (or at least not sufficiently transparent to) low energy x-rays. It may therefore be necessary to install windows made of an x-ray transparent material such as beryllium, titanium, or carbon fiber, or to use a composite window made of layers of several materials. Beryllium, for example, may be covered by a thin coating of nickel to prevent corrosion and may be protected from direct contact with the fluid by a layer of a corrosion and erosion resistant plastic such as PEEK (poly-ether-ether-ketone).

As stated above, the measurement of the composition of the fluid in the pipe may be obtained as described in U.S. Pat. No. 7,542,543, relying on the prior art apparatus shown in FIG. 1. The basic approach is to measure the attenuation of the x-ray flux by the fluid that is traversed by the x-rays. The attenuation in water, oil, and gas, in particular at higher x-ray energies (i.e., 30 keV or higher), is dominated by the impact of Compton scattering, and therefore by the electron density of the medium that is traversed by the x-rays. If the fluid contains one or more components with higher atomic numbers (Z), then there is an impact from photoelectric absorption, which depends strongly on the atomic number of the medium. If dual x-ray energies are available, then a more accurate determination of density and fluid composition is possible. Such dual x-ray energies may be provided by placing a characteristic filter in the path of the x-rays emitted from the source before the x-rays enter the fluid. Such a filter may be part of the window that allows passage of the x-rays into the fluid, it may be incorporated separately, or it may be part of the target construction of the x-ray generator.

Figure 3:
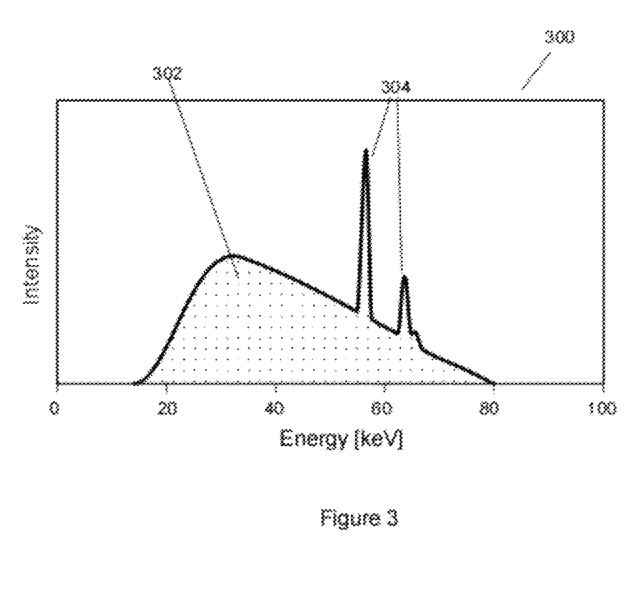
FIG. 3 is a graph of an x-ray spectrum obtained when irradiating tantalum with 80-keV electrons.

A different way of obtaining a dual energy spectrum is to make use of the fact that the electron bombardment of the target does not only generate a continuous energy spectrum of Bremsstrahlung x-rays, but also characteristic x-rays of the inner shells of the target atoms, typically x-rays of the two innermost shells (K- and L-shells). This requires that the electron energy exceed the binding energy of an electron in such an inner shell. For example, the binding energy of a K-electron in tantalum is 67.4 keV. Following the ionization, the tantalum K-shell K-x-rays will be emitted with principal energies of about 57 keV. FIG. 3 shows a graph 300 of an x-ray spectrum generated in a tantalum target by 80 keV electrons. One observes the continuous Bremsstrahlung spectrum 302 and sharp peaks 304 at well-defined energies corresponding to inner shell transitions in tantalum. By measuring the changes in the spectrum using (x-ray) signal detector 112 (see FIG. 2), one can determine the attenuation of the x-rays in distinct energy ranges. This allows the determination of not only an apparent density of the fluid, but also of its effective atomic number. This makes it possible to correct for the presence of higher Z elements such as chlorine or possibly sulfur.

In another embodiment, one or more reference detectors 106 may be mounted spatially separate from the source on spokes about the source, but with passageways for x-rays that are not fluid-filled. This allows reference detectors 106 to be away from any electrical accelerating fields used to generate the x-rays, which may be a source of noise for reference detectors 106. In addition, placing reference detectors 106 outside of source housing 104 reduces the number of wire feedthroughs required. The "spokes" could act to mechanically stabilize the source housing 104 within the flow stream, reducing mechanical vibration. Alternatively, these "spatial variation" reference detectors 106 could be identical to the signal detectors 112 and located in an identical manner in the same source housing 104 with increasing commonality of electronics, with reduced dynamic range between the fluid sensing and non-fluid sensing paths.

In operation, fluid flow is directed (in the direction of the arrow in FIG. 2) into measurement system 100 through the central passageway of tool housing 110 and around source housing 104. Electrical control signals pass (via feedthroughs) through bulkhead 128 to a control unit in the pressure vessel outside of the tool housing 110 using another feedthrough in a second bulkhead (not shown). The bulkhead is part of the protective envelope provided by source housing 104 for the x-ray generator 108 and, optionally, the one or more reference detectors 106. The atmosphere inside source housing 104 may be, for example, sulfur hexafluoride ($SF_6$) at several atmospheres of pressure to provide insulation between the negative high voltage applied to the cathode 102 and the ground potential of source housing 104 and anode 108. The signal detectors 112 and electronics outside of the flow pipe (tool housing) 110 are also enclosed in a hermetically sealed pressure containers (not shown).

Source housing 104 may be located downstream of a flow conditioning device. One type of flow conditioning device (e.g., a venturi, a valve, or a constriction element) could induce mixing. Such a flow conditioning device would ensure the flow is radially symmetric for at least some portion of the flow path if the flow rate is adequate (i.e., above a critical rate). Alternatively, the flow conditioning device may provide fluid segregation. One may choose a particular geometry and/or location of an x-ray detector based on the anticipated segregation. Yet another fluid conditioning device is one that induces radial segregation such as when the fluid is swirled. This would allow measurement using a single x-ray detector. Note the above flow conditioning devices condition the fluid in the cross-section of the flow. They do not condition in the axial direction. Thus, one should resolve the time variation of the flow (e.g., if slugging occurs). Time averaging is one possible technique to resolve the time variation of the flow.

Because the downhole densitometer disclosed herein relies on measurements of x-ray attenuation, it is sensitive to all species in the x-ray path. Thus, corrections are required. Those corrections may be derived, for example, from calibration signals or from secondary measurements. For instance, the x-ray attenuation of water depends on its salt content. The electrical conductivity of the water may be measured and correlated to the salt content. The determined salt content can then be used to correct the x-ray attenuation.

Figure 4:
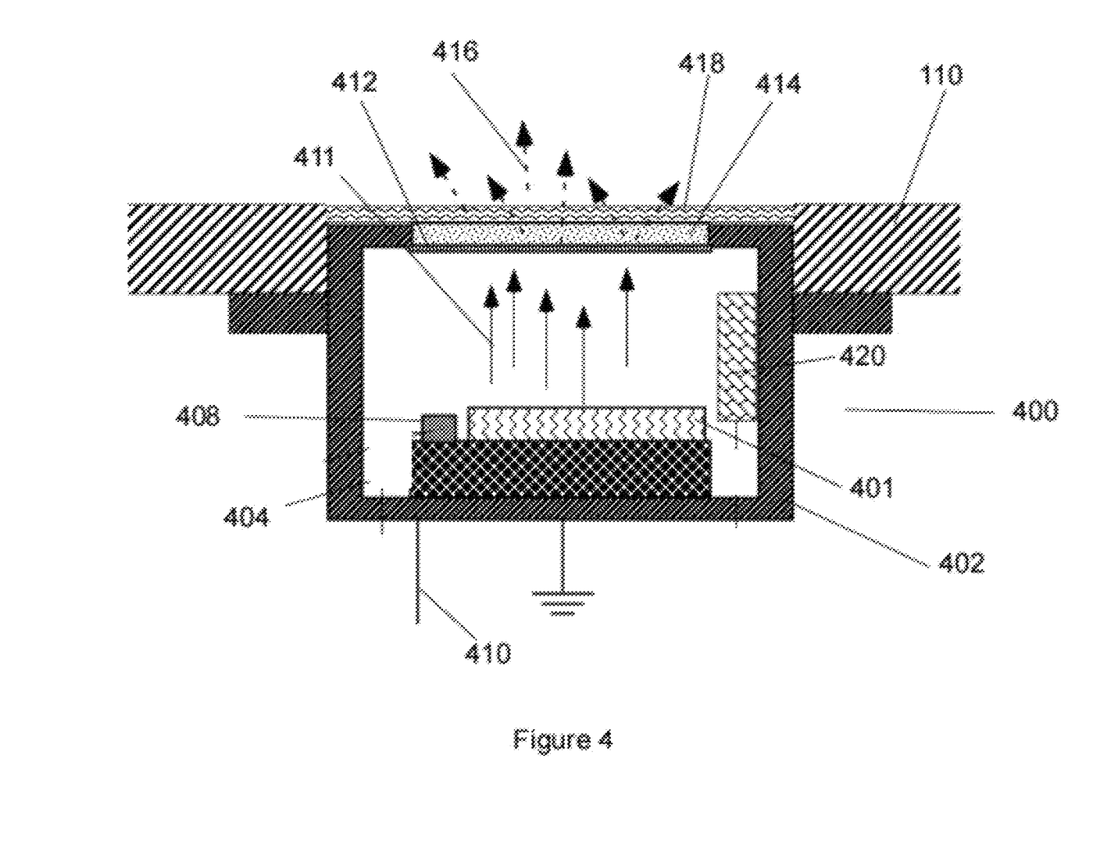
FIG. 4 is a schematic drawing of a pyroelectric x-ray generator suitable for making downhole measurements, in accordance with the present disclosure.

In one possible embodiment, the x-ray generator 130 is a pyroelectric device 400, as shown in FIG. 4. A pyroelectric element 401 is contained in a housing 402 that is filled with a low pressure gas. The housing 402 also contains a heater 404 in thermal contact with (in this case, disposed immediately below) pyroelectric element 401. Also in thermal contact with heater 404 is a temperature sensor 408. Heating pyroelectric element 401 with heater 404 (with power provided through a power wire 410) will result in a buildup of negative charge on the top surface of the pyroelectric element 401. The resulting electric field between the negatively charged surface of pyroelectric element 401 and a target anode 412 leads to the ionization of the gas near the pyroelectric element 401. The resulting free electrons 411 are accelerated to the target anode 412, which may comprise a layer of a material such as copper or silver deposited on a window 414 made of an x-ray transparent material such as beryllium. The electrons impinging on the target anode 412 create x-rays from Bremsstrahlung radiation and characteristic x-rays 416, which pass through window 414 (and the optional protective cover 418) into the fluid under investigation. The charge built up by the heating of pyroelectric element 401 is dissipated by the electron generation. In order to obtain more x-rays, the pyroelectric element 401 is cooled or allowed to cool. This reverses the polarity and electrons are emitted from the gas close to target anode 412 and generate x-rays on pyroelectric element 401. Most or all of those x-rays will not be observed outside of the device 400. The heating/cooling cycle may take several minutes and x-rays may therefore only be emitted at intervals of several minutes.

In the embodiment of FIG. 4, the x-ray generator is directly inserted in a porthole of the tool housing 110. It could similarly be mounted in a pressure container surrounded by the fluid. Also shown in FIG. 4 is an optional reference detector 420 contained in the same housing 402 as the pyroelectric element 401. Alternatively, one or more reference detectors could be mounted outside the housing 402. This may necessitate additional windows 414. In yet another embodiment, the tool housing 110 may be made entirely of an x-ray transparent material such as beryllium.

In the x-ray generator shown in FIG. 4, the tool housing 110 with window 418 is constructed to serve also as a pressure barrier. In a different embodiment, the pressure barrier, which may be equipped with a window, may be separate from tool housing 110 of the x-ray generator. In this case, the tool housing 110 of the x-ray generator may be made of a thin sheet of x-ray transparent material. In yet another embodiment, the anode (target) 412 may be, for example, dome-shaped (concave), conical (convex), or pyramidal. It is also possible that a flat anode 412 is slanted at an angle, i.e., not perpendicular to the axis of the device.

In a configuration, the signal attenuation for 20-keV x-rays is estimated as follows. The signal passing through 6 mm of water contributes 21 dB of attenuation and the signal passing through 2×1-mm thick diamond windows contributes 4 dB of attenuation (21 dB+4 dB=25 dB). For a source-detector distance of 17 mm (assuming a point source) and radial detector areas of 7 $mm^2$ (3 mm diameter), the intercepted area contributes 34 dB of attenuation. Thus, the total source-detector attenuation for this configuration is 59 dB. (25 dB+34 dB=59 dB.) For a peak flux of $10^8$ photons/sec, which may be obtained from a pyroelectric generator, the peak detection rate would be 100 events/sec. If faster measurement and less averaging is desired, the same configuration may be used at higher x-ray energy, for example 60 keV. The total source-detector loss would be 41 dB and the peak detection rate would then be 10,000 events/sec. This is one of the reasons it is preferable to operate at higher energies, where possible.

As stated above, various sources may be used, and the source can be variously positioned relative to the flow. For instance, a pyroelectric source of x-rays may be selected for use in a permanent installation downhole. A single pyroelectric supply may be used or, if desired, a pyroelectric supply could be used to double the available high voltage. Alternatively, the radiation source may be a radioisotopic source mounted so as to be centered in the flow. In either embodiment, the x-ray or gamma ray device could be incorporated into the venturi (flow-rate meter) or mounted separate from the venturi. The device may be centered in the flow and shaped (e.g., non-cylindrical) so as to provide several different path lengths. Alternatively, the device could be mounted so as to not be centered in the flow, thereby allowing an operator to obtain a variety of attenuation paths in the fluid. Additional changes in the flow path can be achieved by moving the detector axially away from the shortest distance to the source. This is indicated by detector 114 in FIG. 2.

A traditional generator with a compact, high efficiency Cockcroft Walton high voltage supply could be used. A bipolar supply would be well suited for this application and would reduce the high voltage that needs to be held off with respect to ground by approximately 50%. An x-ray generator using a piezoelectric high voltage supply is yet another alternative, as is a compact x-ray tube with an integrated high voltage supply.

The x-ray device may also comprise an x-ray monitor. The monitor could be mounted as part of the centered device, mounted external to the source housing but with a non-fluid-filled passage for x-rays to the monitor, or any other suitable x-ray or gamma ray detector.

The device may also include additional collimation to limit the solid angle of the x-rays traversing the fluid and/or to limit the acceptance angle of the radiation detectors, including the reference detector. Collimation may be made by using high Z materials such as tungsten. At lower x-ray energies, lower Z-materials, including steel, may suffice.

Many kinds of x-ray detectors may be used for the measurement. For example, traditional scintillator-based detectors with photomultiplier tubes (PMTs) or other photon detectors may be used. Alternatively, for a particular environment such as a high temperature environment, one may select solid state detectors made from materials such as diamond or silicon carbide. One or more detector arrays may be used comprising a particular type of detector or a mix of various detector types. Scintillation detectors fiber-optically coupled to a (position sensitive) photon detector may be used to obtain a position sensitive read out. Gas-filled counters such as Geiger-Müller (GM) tubes or high pressure xenon- or argon-filled detectors may also be used as detectors.

Figure 5:
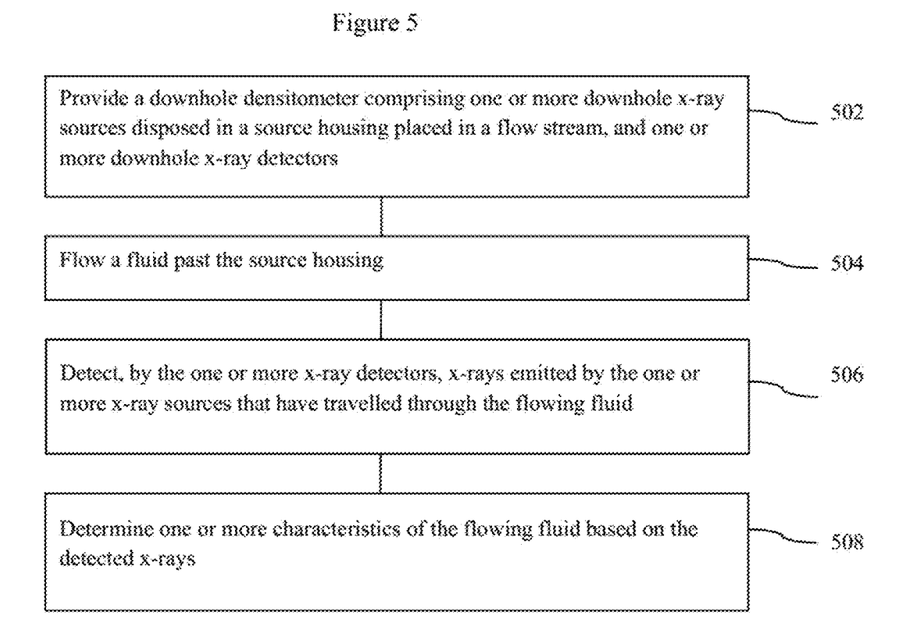
FIG. 5 is a flowchart for using x-rays for downhole densitometry to measure the gas, oil, and water ratios of downhole hydrocarbon production, in accordance with the present disclosure.

FIG. 5 is a flowchart for one embodiment of using a densitometer to determine one or more characteristics of a flowing fluid. A downhole densitometer comprising one or more downhole x-ray sources disposed in a source housing placed in a flow stream, and one or more downhole x-ray detectors is provided (502). A fluid is allowed to flow past the source housing (504). X-rays emitted by the one or more x-ray sources and that have travelled through the flowing fluid are detected by the one or more x-ray detectors (506). One or more characteristics of the flowing fluid are determined based on the detected x-rays (508). Where a dual-energy source or two sources of different energy are employed, the average density of the fluid in a given beam path is a direct relation of the attenuation experienced at the two different photon energies. However, where a single energy source is employed, more complex interpretation based on the broadband Bremsstrahlung radiation may be required to extract fluid density uniquely with just the densitometer. Alternatively, one may employ additional sensors within the system, such as capacitance, resistivity, acoustic, thermal, or higher frequency electromagnetic sensors to assist with the deconvolution. Where the flow has variable composition, such as within slug flow, the variation with time could be used to interpret for the different flowing phases. Finally, a valve system could be used further downstream to stimulate flow regime modifications, which may include stratification within the fluid flow. The spatial variation of the flow is used to calculate the volume of the phases present. As the valve is choked in a horizontal pipe, separated gas and dispersed water/oil phases are produced. Upon further choking of the valve, separated gas, oil and water phases are produced.

Where the aqueous phase includes quantities of dissolved species one may need to employ a calibration procedure based on the aforementioned resistivity sensor. One may measure the aqueous conductivity to apply an attenuation correction based on the quantity of salts dissolved. Calibration for changing pressure or temperature conditions, particularly for any gas phase, may be achieved for all phases present by employing flow capture or stratification using in-completion valve systems to choke the flow downstream and induce separation within a horizontal wellbore. This allows one to directly measure the attenuation of each separated phase individually.

Some of the methods and processes described above, including processes, as listed above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method comprising:
   providing a downhole densitometer comprising one or more downhole x-ray sources disposed in a source housing placed in a flow stream, wherein the one or more downhole x-ray sources comprise a pyroelectric x-ray generator, and one or more downhole x-ray detectors mounted outside of the source housing, wherein the one or more downhole x-ray sources direct x-rays in a direct beam path that traverses the flow stream to at least one x-ray detector;
   flowing a fluid past the source housing;
   detecting, by the one or more x-ray detectors, x-rays emitted by the one or more x-ray sources that have travelled through the flowing fluid; and
   determining one or more characteristics of the flowing fluid based on the detected x-rays.

2. The method of claim 1, wherein at least one of the one or more downhole x-ray sources is a low energy x-ray source.

3. The method of claim 1, further comprising using the densitometer in conjunction with one or more other sensors.

4. The method of claim 3, wherein the one or more other sensors are selected from a group consisting of capacitance sensors, flow-rate sensors, pressure sensors, resistivity sensors, acoustic sensors, thermal sensors, and high frequency electromagnetic sensors.

5. The method of claim 1, further comprising locating the source housing downstream of a flow conditioning device.

6. The method of claim 1, further comprising determining an average over a period of time using the detected x-rays, and using the determined average to determine the one or more characteristics of the flowing fluid.

7. The method of claim 1, further comprising generating x-rays from two or more targets within at least one of the one or more x-ray sources.

8. The method of claim 1, wherein the one or more characteristics of the flowing fluid are selected from a group consisting of nuclear attenuation, a gas ratio, an oil ratio, and a water ratio.

9. The method of claim 8, further comprising determining a salt concentration from the detected x-rays, and correcting the water ratio using the determined salt concentration.

10. The method of claim 1, further comprising measuring a reference signal and using the measured reference signal to normalize and/or control source emissions.

11. The method of claim 1, wherein a reference electrode is within a housing containing the pyroelectric x-ray generator.

12. The method of claim 1, wherein the x-ray source is a dual-energy source.

13. A system, comprising:
    one or more downhole x-ray sources disposed in a source housing, wherein the one or more downhole x-ray sources comprise a pyroelectric x-ray generator;
    a tool housing having a central passageway in which the source housing is disposed and through which fluid can flow; and
    one or more downhole x-ray detectors mounted outside of the source housing in the tool housing, wherein the one or more downhole x-ray sources direct x-rays in a direct beam path that traverses the central passageway to at least one x-ray detector.

14. The system of claim 13, wherein each of the one or more x-ray sources comprises an electron emitter and a target.

15. The system of claim 14, wherein the target is conical, dome-shaped, or pyramidal, and coated with a target metal.

16. The system of claim 14, wherein each of the one or more x-ray detectors is installed with an offset and an angle relative to the target.

17. The system of claim 13, further comprising one or more reference detectors disposed in the source housing.

18. The system of claim 13, further comprising one or more reference detectors disposed in the central passageway external to the source housing, each of the one or more reference detectors being joined to non-fluid-filled passageways through which x-rays from the one or more x-ray sources pass.

19. The system of claim 13, wherein the one or more x-ray detectors comprises a plurality of x-ray detectors distributed circumferentially around the tool housing.

20. The system of claim 13, wherein each of the one or more x-ray detectors comprises a window.

21. The system of claim 13, wherein each of the one or more x-ray sources is selected from a group consisting of a pyroelectric source, a radioisotope source, and an x-ray tube source.

22. The system of claim 13, further comprising an x-ray monitor.

23. A system, comprising:
- one or more downhole x-ray sources disposed in a source housing, wherein the one or more downhole x-ray source comprise a pyroelectric x-ray generator;
- a tool housing having a central passageway in which the source housing is disposed and through which fluid can flow and in which the one or more x-ray sources are disposed;
- one or more downhole x-ray detectors mounted outside the source housing, wherein the one or more downhole x-ray sources direct x-rays in a direct beam path that traverses the central passageway to at least one x-ray detector; and
- a processor located on the earth surface or carried on the tool housing capable of:
- flowing a fluid through the central passageway between the one or more x-ray sources;
- detecting, by the one or more x-ray detectors, x-rays emitted by the one or more x-ray sources that have travelled through the flowing fluid; and
- determining one or more characteristics of the flowing fluid based on the detected x-rays.

* * * * *